US008824892B2

(12) United States Patent
Tamai et al.

(10) Patent No.: US 8,824,892 B2
(45) Date of Patent: Sep. 2, 2014

(54) OPTICAL LINE TERMINAL FOR OPTOELECTRICALLY CONVERTING A SIGNAL AND A METHOD THEREFOR

(75) Inventors: Hideaki Tamai, Saitama (JP); Satoshi Furusawa, Chiba (JP); Akiya Suzuki, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 264 days.

(21) Appl. No.: 13/537,567

(22) Filed: Jun. 29, 2012

(65) Prior Publication Data

US 2013/0004171 A1 Jan. 3, 2013

(30) Foreign Application Priority Data

Jul. 1, 2011 (JP) .................. 2011-147232

(51) Int. Cl.
*H04B 10/00* (2013.01)
*H04L 12/28* (2006.01)
*H04L 12/12* (2006.01)
*H04B 10/272* (2013.01)

(52) U.S. Cl.
CPC .......... *H04B 10/272* (2013.01); *H04L 12/2861* (2013.01); *H04L 12/12* (2013.01); *H04L 12/287* (2013.01); *Y02B 60/34* (2013.01)
USPC ............................ 398/72; 398/71

(58) Field of Classification Search
CPC ..................................... H04B 10/00
USPC ........................................ 398/66-73
See application file for complete search history.

(56) References Cited

U.S. PATENT DOCUMENTS

| 8,170,414 | B2 * | 5/2012 | Liu et al. .......................... 398/25 |
| 8,676,054 | B2 * | 3/2014 | Suzuki et al. .................... 398/45 |
| 2005/0260001 | A1 * | 11/2005 | Sakamoto ..................... 398/202 |
| 2007/0122151 | A1 | 5/2007 | Watanabe |
| 2007/0230958 | A1 * | 10/2007 | Jiang et al. ....................... 398/72 |
| 2008/0181603 | A1 * | 7/2008 | Liu et al. .......................... 398/25 |
| 2013/0004171 | A1 * | 1/2013 | Tamai et al. ..................... 398/66 |
| 2013/0251362 | A1 * | 9/2013 | Li et al. ............................ 398/25 |

OTHER PUBLICATIONS

"Technical Fundamentals Lecture [GE-PON Technology]", NTT Technical Journal, Aug. 2005, pp. 71-74, vol. 17, No. 8.

* cited by examiner

*Primary Examiner* — Agustin Bello
(74) *Attorney, Agent, or Firm* — Rabin & Berdo, P.C.

(57) ABSTRACT

In an optical line terminal connectable to optical network units in an optical communication network, an receiver converts an upstream optical signal, received from an optical network unit, into a corresponding upstream electric signal and then derives an upstream control signal controlling the optical line terminal from the upstream electric signal. A controller generates a power control signal switching on or off power supply to the receiver on the basis of the upstream control signal, and a power feeder switches on or off the power supply to the receiver in response to the power control signal. Thus, the optical line terminal can reduce the waste of standby electricity.

13 Claims, 6 Drawing Sheets

OPTICAL LINE TERMINAL FOR OPTOELECTRICALLY CONVERTING A SIGNAL AND A METHOD THEREFOR

BACKGROUND OF THE INVENTION

1. Field of the Invention

The present invention relates to an optical line terminal (OLT), and more particularly to an OLT connected to a plurality of optical network units (ONUs), the OLT and the ONUs forming a passive optical network (PON). The present invention also relates to a method of optoelectrically converting a received signal.

2. Description of the Background Art

A telecommunications network connecting a station of a telecommunications carrier to subscriber premises equipment is defined as an access network. With a recent increase in communication traffic, in the field of access networks, optical access networks are now prevailing which accomplish transmission of an enormous volume of information by means of optical communication.

The optical access networks are exemplified by a PON. The PON includes an OLT installed in a carrier station, a plurality of ONUs installed in respective subscriber premises, and an optical splitter. The OLT is interconnected to the ONUs via the optical splitter by optical fibers.

The interconnection of the OLTs to the optical splitter is implemented by a single-core optical fiber. The single-core optical fiber is shared in use by the plurality of ONUs. Optical splitters are inexpensive passive devices. Thus, the PON is highly economical and can be readily maintained. Therefore, PONs are rapidly prevailing.

The PON relies upon various kinds of multiplex technique. Typical multiplex techniques used in the PON may be exemplified by the time division multiplex (TDM) allocating subscribers to short sections of a time axis, or time slots, the wavelength division multiplex (WDM) allocating subscribers to different wavelengths, the code division multiplex (CDM) allocating subscribers different codes. Among those multiplex schemes, the TDM-PON, using the TDM, has recently become most predominant, as disclosed in "Technical Fundamentals Lecture [GE-PON Technology]", NTT Technical Journal, Vol. 17, No. 8, pp. 71-74, August 2005.

In the PON, communication signals transmitted from the respective ONUs toward the OLT, i.e. upstream signals, are combined in the optical splitter and then transmitted to the OLT. A communication signal transmitted from the OLT and meant for the respective ONUs, i.e. downstream signal, is split by the optical splitter into signals, which are in turn transmitted to the respective ONUs.

The upstream signal includes an upstream data signal and an upstream control signal. The upstream data signal is defined as a signal transmitted from user apparatus connected to the ONU toward an upper-layer network, e.g. application layer, connected to the OLT. In detail, the upstream data signal carries information the user requests the OLT to transmit to the upper-layer network. The upstream control signal is defined as a signal transmitted from the controller in the ONU toward the controller in the OLT for use in controlling the PON.

The downstream signal includes a downstream data signal and a downstream control signal. The downstream data signal is defined as a signal transmitted from the upper-layer network to the user apparatus. In detail, the downstream data signal carries information requested to be received by the user. The downstream control signal is defined as a signal transmitted from the controller in the OLT toward the controller in the ONU for use in controlling the PON.

The TDM-PON uses a time division multiple access (TDMA). The TDMA is a technique in which the OLT manages the ONUs to control the transmission timing therebetween so that an upstream signal from an ONU does not collide with an upstream signal from another ONU.

In the TDM-PON, the time axis is divided into a plurality of short slots. The short slots are allocated to the respective ONUs as bands, each of which different one ONU may use to transmit an upstream signal toward the OLT. Which transmission timing and which bandwidth each of the ONUs is to use in transmitting an upstream signal are instructed by the OLT to the ONU. The allocation of bands to the ONUs by the OLT as described above may be referred to as band allocation. In the context, the "bandwidth" maybe represented with respect to time, for example, seconds.

As disclosed in U.S. patent application publication No. US 2007/0122151 A1 to Watanabe, known band allocation procedures are exemplified by a dynamic bandwidth allocation (DBA). In the DBA, the OLT receives requests for transmission band from the ONUs and dynamically allocates communication bands on the basis of the requests.

In the above conventional band allocation procedure, after bands requested from all of the ONUs are allocated, if allocable bands still remain, they are allocated to the respective ONUs as surplus bands. In this case, the OLT itself is surely aware of receiving upstream signals in the periods corresponding to the requested bands, but not whether to receive an upstream signal in the periods corresponding to the surplus bands. Therefore, the OLT has to always keep rendering its receiver for upstream signal in the standby state also in the periods corresponding to the surplus bands. Unless the receiver receives an upstream signal in the corresponding periods, it wastes standby electricity.

SUMMARY OF THE INVENTION

It is therefore an object of the present invention to provide an optical line terminal, an optical communication network and a power supply control method, which are capable of saving the standby electricity.

In accordance with the present invention, an optical line terminal forming an optical communication network together with a plurality of optical network units in includes an receiver for converting an upstream optical signal, received from the optical network unit, into a corresponding upstream electric signal and then deriving an upstream control signal controlling the optical line terminal from the upstream electric signal, a controller operative in response to the upstream control signal for generating a power control signal switching on or off power supply to the receiver, and a power feeder operative in response to the power control signal for switching on or off the power supply to the receiver.

Also in accordance with the present invention, an optical communication network has an optical line terminal and a plurality of optical network units connected to the optical line terminal, the optical line terminal including an receiver for converting an upstream optical signal received from the optical network unit into a corresponding upstream electric signal and then deriving an upstream control signal controlling the optical line terminal from the upstream electric signal, a controller operative in response to the upstream control signal for generating a power control signal switching on or off power supply to the receiver, and a power feeder operative in response to the power control signal for switching on or off the power supply to the receiver.

Also in accordance with the present invention, a method for controlling power supply of an optical line terminal forming an optical communication network together with a plurality of optical network units, the optical line terminal having an receiver converting an upstream optical signal received from the optical network unit into a corresponding upstream electric signal and then deriving an upstream control signal controlling the optical line terminal from the upstream electric signal, includes the steps of setting by the optical line terminal, when the optical line terminal receives information on a requested band corresponding to an upstream data signal generated in the k-th cycle (k is a natural number) from the optical network unit, an allocation band for the optical network unit on the basis of the requested band; reporting the set allocation band in the (k+2)-th cycle to the optical network unit from the optical line terminal; and setting by the optical line terminal, when then optical network unit transmits the upstream data signal generated in the k-th cycle so that in the (k+2)-th cycle the optical line terminal receives the upstream data signal generated in the k-th cycle, a period corresponding to the allocation band in the (k+2)-th cycle as a power-on period to enable power supply to the receiver and a period other than the power-on period in the (k+2)-th cycle as a power-off period to stop the power supply to the receiver.

In accordance with the present invention, the standby electricity for the optical line terminal can be minimized.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Preferred embodiments in accordance with the present invention will be described below with reference to the accompanying drawings. In the drawings, the components and elements are merely schematically depicted to the extent that the present invention can be appreciated. Preferred embodiments described below are mere examples and would therefore not be comprehended as restricting the present invention by the details thereof.

Figure 1:
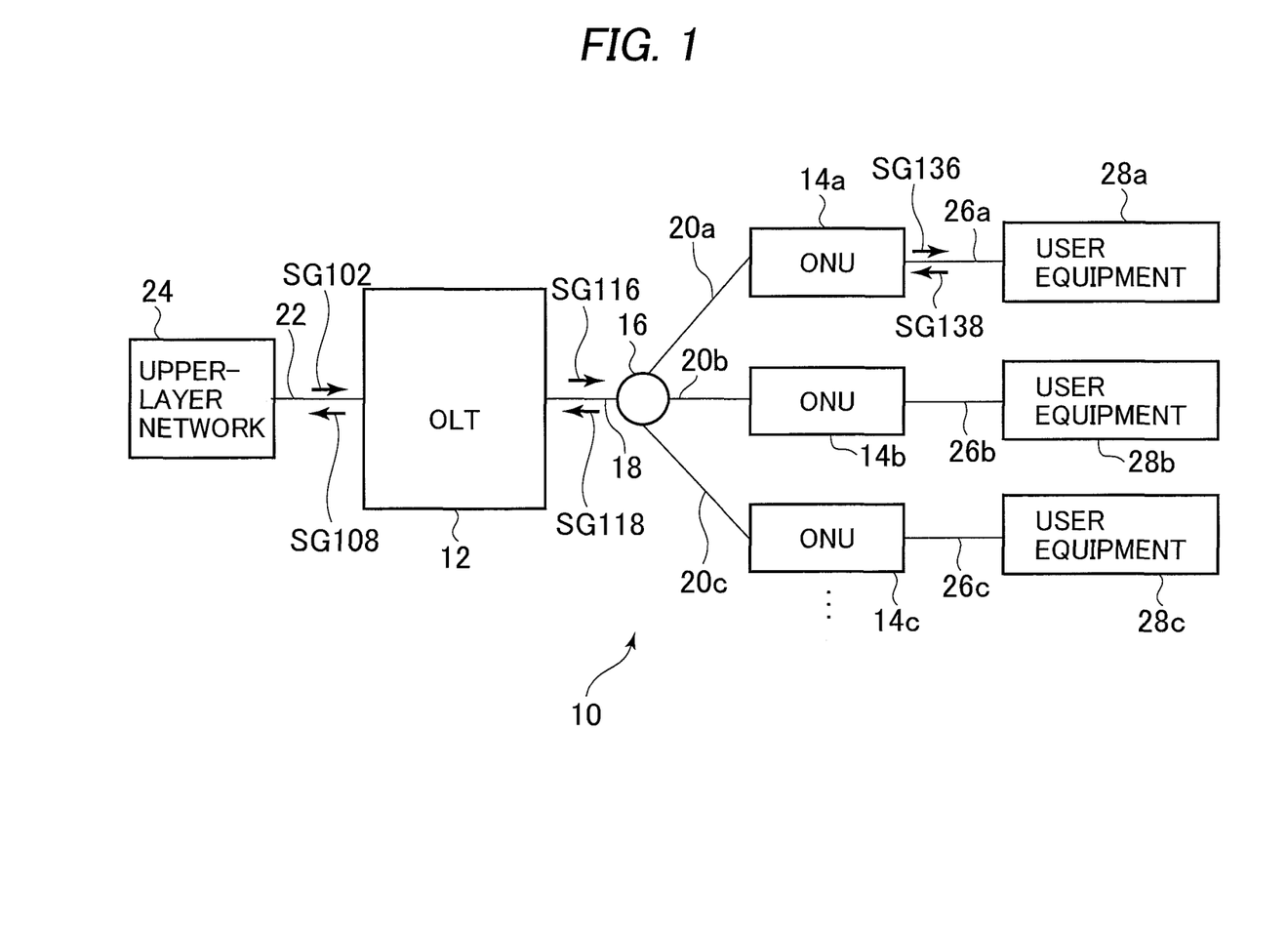
FIG. 1 is a schematic block diagram showing the configuration of an optical communication network in accordance with a preferred embodiment of the present invention.

With reference to FIG. 1, an optical communication network for providing a fiber to the home (FTTH) service in accordance with an illustrative embodiment of the present invention will be described. FIG. 1 schematically shows the configuration of the optical communication network in accordance with the embodiment. The optical communication network 10 of the embodiment is a passive optical network (PON) 10 including an optical line terminal (OLT) 12, installed in a station of a telecommunications carrier, or central office, and a plurality of, e.g. three optical network units (ONUs) 14a to 14c, installed in the premises of subscribers. The OLT 12 is interconnected to the ONUs 14a to 14c through an optical splitter 16 by optical fibers. More specifically, the OLT 12 is interconnected by an optical fiber 18 to the optical splitter 16 for combining and splitting optical signals, which is further interconnected to the ONUs 14a-14c by optical fibers 20a-20c.

In FIG. 1, three ONUs 14a to 14c are exemplarily shown. The number of ONUs constituting the PON 10 is not restricted to three but the PON 10 may include an arbitrary number of ONUs The PON 10 may be constituted by conventional components or elements known per se, except for the components and elements related to power supply control for the OLT 12. Therefore, a description on such conventional components or elements may be omitted.

The OLT 12 in the PON 10 is connected by a communication line 22 to an upper-layer network 24 such as the Internet. The ONUs 14a-14c in the PON 10 are interconnected by communication lines 26a-26c to user equipment 28a-28c such as personal computers or measuring instruments, respectively.

A signal from the OLT 12 toward each of the ONUs 14a to 14c is referred to as a downstream signal. A signal from the OLT 12 toward each of the ONUs 14a to 14c is referred to as a downstream signal.

The OLT 12 is adapted to transmit optical signals supplied from the ONUs 14 to the upper-layer network 24 and signals supplied from the network 24 to the ONUs 14. The OLT 12 is further adapted to control and monitor the whole PON 10 and the ONUs 14.

The ONUs 14, provided in the subscriber premises, are adapted to convert optical signals supplied from the OLT 12 to corresponding electrical signals and electrical signals supplied from the user equipment 28 to corresponding optical signals to transmit the latter to the OLT 12.

Now, with the illustrative embodiment, the upstream signal includes an upstream data signal and an upstream control signal. The upstream data signal is transmitted from the user equipment 28a to 28c connected to the respective ONUs 14a to 14c, respectively, toward the upper-layer network 24 connected to the OLT 12. In detail, the upstream data signal carries information the user requests the OLT 12 to transmit to the upper-layer network. The upstream control signal is transmitted from a controller 86, FIG. 3, in each of the ONUs 14 to a controller 44, FIG. 2, in the OLT 12, for use in controlling the entire PON 10, as will be described later on. The upstream control signal carries information on a band the ONU 14 requests the OLT 12 to allocate, such information being, for example, on the length of a queue.

Figure 2:
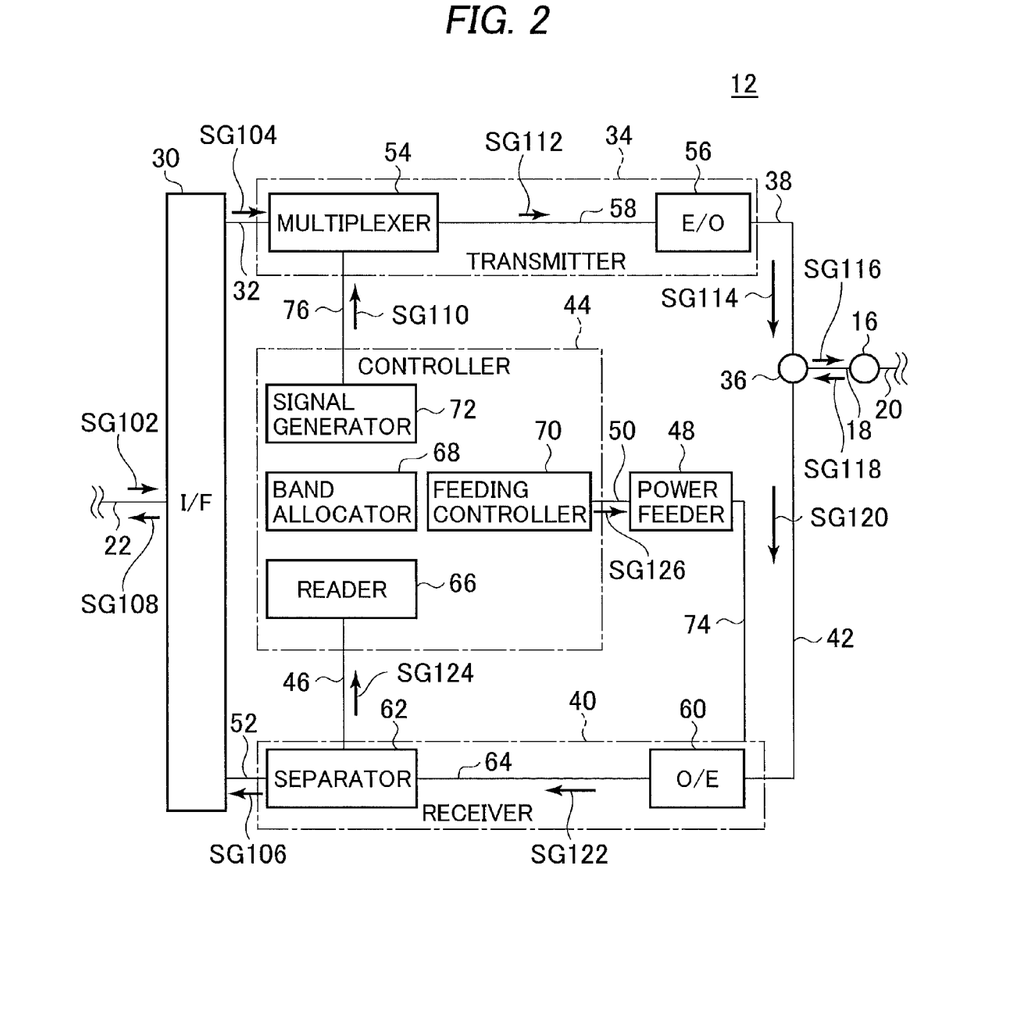
FIG. 2 is a schematic block diagram showing the configuration of the optical line terminal (OLT) shown in FIG. 1.
Figure 3:
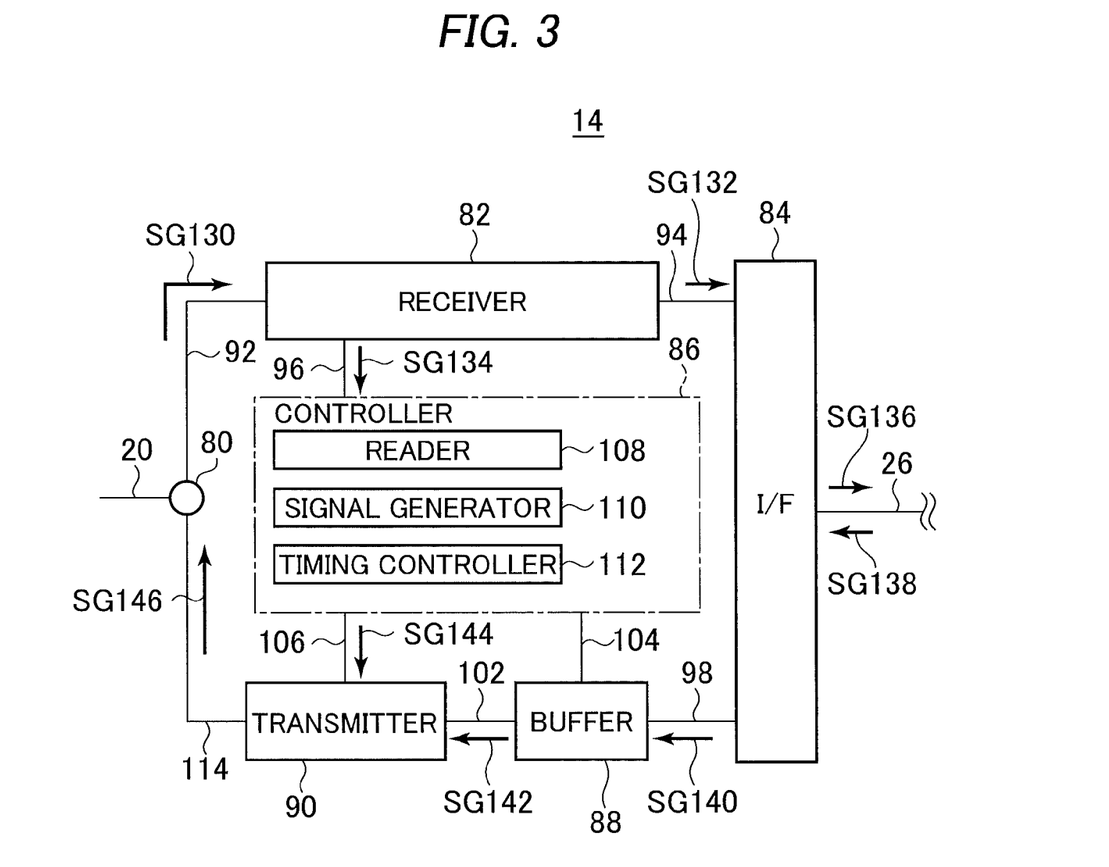
FIG. 3 is a schematic block diagram showing the configuration of the optical network unit (ONU) shown in FIG. 1.

Also with the illustrative embodiment, the downstream signal includes a downstream data signal and a downstream control signal. The downstream data signal is transmitted from the upper-layer network 24 to the user equipment 28. In detail, the downstream data signal carries information requested to be received by the user. The downstream control signal is transmitted from the controller 44 in the OLT 12 to the controller 86 in each of the ONUs 14, as described later. The downstream control signal carries, for example, information on a band in which the OLT 12 permits the ONU 14 to transmit signals, more specifically, information on the bandwidth and timing of transmitting signals.

The signal can be in an electric or optical form according to the circumstances because the OLT 12 and the ONUs 14 is adapted to appropriately convert the signals as previously described. When it is necessary to distinguish electric and optical signals from each other in the context, the upstream and downstream signals may be referred to as an upstream electric or optical signal and as a downstream electric or downstream optical signal, respectively.

In order to stably communicate over the PON 10, the upstream and the downstream control signal are transmitted and received between the OLT 12 and each of the ONUs 14a to 14c. The period in which a control signal is transmitted or received is referred to as an allocation period or dynamic bandwidth allocation (DBA) period.

Next, the configuration of the OLT 12 in accordance with the illustrative embodiment will be described with reference to FIG. 2. For transmitting signals supplied from the upper-layer network 24 to each ONU 14, the OLT 12 includes an interface (I/F) 30 connected by the communication line 22 with the network 24, a downstream signal transmitter 34 connected to the upper-layer network 24 by a line 32 and the interface 30, and an optical multi/demultiplexer 36 connected with the downstream signal transmitter 34 by a line 38. Those constituent elements may advantageously be fabricated on a substrate.

Further, for transmitting optical signals supplied from the ONUs 14 to the network 24, the OLT 12 includes a receiver 40 connected with an output 42 of the optical multi/demultiplexer 36 to receive an upstream signal. The OLT 12 further includes a controller 44 connected with an output 46 of the receiver 40, and a power feeder 48 connected with an output 50 of the controller 44.

The interface 30 connected with the upper-layer network 24 is adapted to perform communication control in accordance with a communication protocol over an external network, i.e. network 24. Specifically, the interface 30 performs the communication protocol process for a downstream data signal, indicated by an arrow SG102 in FIGS. 1 and 2, transmitted from the upper-layer network 24, and then transfers the processed signal on the line 32 to the downstream signal transmitter 34, indicated by an arrow SG104 in FIG. 2.

The interface 30 is also connected with an output 52 of the receiver 40 and adapted to perform communication control in accordance with the communication protocol on the upstream data signal SG106 received from the receiver 40. The interface then transmits the processed upstream signal to the upper-layer network 12, indicated by an arrow SG108 in FIGS. 1 and 2.

The downstream signal transmitter 34 includes a multiplexer 54 for multiplexing supplied downstream signals, and an electrooptic converter (E/O) 56 connected with an output 58 of the multiplexer 54.

The multiplexer 54 serves as time-multiplexing the downstream data signal SG104 with a downstream control signal SG110 supplied from the controller 44 to produce a downstream electric signal, indicated by an arrow SG112 in FIG. 2. The produced electric signal SG112 is delivered over the line 58 to the electrooptic converter 56.

The electrooptic converter 56 functions as electrooptically converting the downstream electric signal SG112 to produce a corresponding downstream optical signal, indicated by an arrow SG114 in FIG. 2. The produced optical signal SG114 is delivered on the line 38 to the optical multi/demultiplexer 36.

The optical multi/demultiplexer 36 serves to multiplex several optical signals whose wavelengths are different to each other and demaltiplexe a multiplexed optical signal with respect to wavelength. In this illustrative embodiment, the optical multi/demultiplexer 36 transmits the downstream optical signal SG114, which is produced in and supplied from the electrooptic converter 56, over the line 18 to the ONUs 14, indicated by an arrow SG116 in the figure. The optical multi/demultiplexer 36 also transmits on the line 42 to the receiver 40 the upstream optical signal, indicated by an arrow SG118, received from each ONU 14.

Generally, the central wavelength of the upstream optical signals may be different from that of the downstream optical signals. Therefore, the optical multi/demultiplexer 36 is configured to include, for example, an optical wavelength filter, not shown.

The receiver 40 includes an optoelectric converter (O/E) 60 directly connected with the output 42 of the optical multi/demultiplexer 36. The optoelectric converter 60 functions as optoelectrically converting an upstream optical signal, indicated by an arrow SG120, received from each ONU 14 via the optical multi/demultiplexer 36 to a corresponding upstream electric signal. The receiver 40 thereby obtains the upstream electric signal.

When the upstream optical signals transmitted from the ONUs 14 are received by the OLT 12, they may significantly have been attenuated through the communication lines such as optical fibers 18 and 20. The optoelectric converter 60 can compensatorily amplify the received attenuated signal.

The receiver 40 further includes a separator 62 connected with an output line 64 of the optoelectric converter 60. The separator 62 is connected to receive on the line 64 the upstream electric signal, indicated by an arrow SG122, developed by the optoelectric converter 62. The separator 62 is adapted to separate the received upstream electric signal SG122 into an upstream control signal, indicated by an arrow SG124, and the upstream data signal, indicated by an arrow SG106.

The receiver 40 has its one output 46 connected to the controller 44 and its other output 52 connected to the interface 30. The upstream control signal SG124 is transferred on the line 46 to the controller 44. The upstream data signal SG106 is transferred on the line 52 to the interface 30.

The controller 44 is adapted to generate a downstream control signal, indicated by an arrow SG110, for reporting an allocation band for the ONUs 14. The controller 44 is also adapted to be responsive to the upstream control signal SG124 to generate a power control signal, indicated by an arrow SG126, which switches the electric power supply on and off to the upstream signal receiver 40.

The controller 44 can be implemented by, for example, a central processing unit (CPU), a random access memory (RAM), and a read only memory (ROM), not specifically shown. In this case, the CPU of the controller 44 reads out and executes program sequences stored in the ROM to thereby serve as a reader 66 for reading the upstream control signal SG124, a band allocator 68 for allocating bands for the ONUs 14, a feeding controller 70 for controlling the power feeding to the receiver 40, and a signal generator 72 for generating the control signal SG110. The results of processes executed in the controller 44 are stored in the RAM in a readable and rewritable manner, and are freely received and transferred throughout the controller 44.

The reader 66 is connected to the upstream signal receiver 40, more specifically to the separator 62, by the line 46. The reader 66 reads information conveyed by the upstream control signal SG124 received from the receiver 40, in particular a queue length in the form of band request.

The band allocator 68 serves to allocate, on the basis of the band request read by the reader 66, an available band to the ONU 14. In this embodiment, the dynamic bandwidth allocation (DBA) is used to allocate a band. According to the DBA, when the OLT 12 receives information on a requested band from each ONU 14, it takes account of the requested bands and dynamically allocates communication bands to those ONUs 14. Particularly, a way of DBA that selects a band to be allocated (simply, allocation band) according to a queue length reported from each ONU 14 is referred to as Status Reporting-DBA (SR-DBA). According to the SR-DBA, a band to be allocated is periodically updated at a predetermined interval, or DBA period.

The SR-DBA may be implemented by the upstream control signal SG124 including information on a bandwidth, e.g. a queue length, which the ONU 14 requests the OLT 12 to allocate, as well as by the downstream control signal SG110 including information on a band in which the OLT 12 permits the ONU 12 to transmit signals, more specifically, information on the timing and bandwidth of transmission.

The feeding controller 70 is connected to receive information on an allocation band from the band allocator 68. The feeding controller 70 is adapted to produce the power control signal SG126 which defines in the DBA period a temporal section corresponding to the allocation band as a power-on period and the remaining temporal section as a power-off period.

The feeding controller 70 has its output 50 connected to the input of the power feeder 48. The power control signal SG126 is transferred from the feeding controller 70 on the connecting line 50 to the power feeder 26.

The power feeder 48 is connected by a line 74 with the upstream signal receiver 40. The power feeder 48 functions to transform a voltage received from the exterior into an intended voltage to supply the intended voltage to the upstream signal receiver 40.

The power feeder 48 includes a switch, not shown, operative in response to the power control signal SG126 to switch the power supply on and off to the upstream signal receiver 40.

The power feeder 48 may not include such a switch device but be adapted to be responsive to the power control signal SG126 to power itself on or off. The power supply of the power feeder 48 per se is thus switched to thereby further save electric power.

It is sufficient for the power feeder 48 to have the function to switch the power supply on and off to the upstream signal receiver 40. Of course, the power feeder 48 maybe adapted to feed electric power to the remaining components of the system.

For example, as with a system configuration where the separator 62 is fed with the power supply system that is common to the controller 44 but separate from the optoelectric converter 60, the entire upstream signal receiver 40 may not be controlled but the optoelectric converter 60 may separately be controlled in terms of power supply switching. In this case, the power supply to the separator 62 may not be switched on and off. Alternatively, additional components for switching power supply to the separator 62 may be provided.

The signal generator 72 is adapted to generate the downstream control signal SG110 for reporting the allocation bands for the respective ONUs 14. The signal generator 72 has its output 76 connected with the multiplexer 54 to transfer the downstream control signal SG110 to the multiplexer 54.

Next, the configuration of the ONU 14 included in the illustrative embodiment of the network will be described with reference to FIG. 3. The ONUs 14a-14c may be the same in configuration as each other, and therefore may generally be designated with a reference numeral 14. The ONU 14 includes an optical multi/demultiplexer 80 connected by the line 20 to the splitter 16, a receiver 82 for converting a downstream optical signal supplied from the optical multi/demultiplexer 80 to a corresponding electric signal, and an interface (I/F) 84 connected between the receiver 82 and the user equipment 28. Those constituent elements may advantageously be fabricated on a substrate.

The ONU 14 also includes a controller 86 for controlling the entire ONU 14, a buffer 88 for temporarily storing therein the upstream data signal received from the user equipment 28, and a transmitter 90 for converting the upstream data signal to a corresponding upstream optical signal to output the latter toward the OLT 12.

The optical multi/demultiplexer 80 is adapted to multiplex several optical signals whose wavelengths are different from each other and demaltiplex a multiplexed optical signal with respect to wavelength. The multi/demultiplexer 80 has its output 92 connected with an input of the downstream signal receiver 82. The optical multi/demultiplexer 80 transfers the downstream optical signal indicated by an arrow SG130 in FIG. 3, which signal is supplied from the OLT 12, on the line 92 to the receiver 82. The optical multi/demultiplexer 80 may be implemented by an optical wavelength filter and so on, like the optical multi/demultiplexer 36 as described earlier.

The receiver 82 is configured similarly to the upstream signal receiver 40 in the OLT 12. The receiver 82 is adapted to optoelectrically convert the downstream optical signal SG130 received from the OLT 12 to obtain a downstream electric signal. The receiver 82 is further adapted to separate the signal SG130 into a downstream data signal, indicated by an arrow SG132 in FIG. 3, and a downstream control signal, indicated by an arrow SG134.

The receiver 82 has its output ports 94 and 96 connected to the interface 84 and the controller 86, respectively. The downstream data signal SG132 is transferred over the line 94 to the interface 84. The downstream control signal SG134 is transferred over the line 96 to the controller 86.

The interface 84 is connected by the line 26 with the user equipment 28 and by a line 98 with the buffer 88 to perform communication control according to a communication protocol on the user equipment 28. Specifically, the interface 84 performs the communication protocol process on the downstream data signal SG132 received from the receiver 82, and, then transfers the processed signal, indicated by an arrow SG136, on the line 26 to the user equipment 28. The interface 84 also performs the communication protocol process on an upstream data signal, indicated by an arrow SG138, received from the user equipment 28, and then transfers the processed signal SG140 over the line 98 to the buffer 88.

The buffer 88 serves as temporarily storing the upstream data signal SG140 received from the interface 84. The buffer 88 has its output port 102 connected to the transmitter 90 to output the stored upstream data signal SG142 according to a reading instruction from the transmitter 90.

The controller 86 has communication lines 96, 104 and 106 connected with the downstream signal receiver 82, the buffer 88 and the transmitter 90, respectively.

The controller 86 in the ONU 14 can be implemented by, for example, a CPU, a RAM and ROM, not specifically depicted, as with the controller 44 in the OLT 12. In this case, the CPU of the controller 86 can read out and execute program sequences stored in the ROM to thereby serve as a reader 108 for reading the control signal SG134, a signal generator 110 for generating an upstream control signal, and a timing controller 112 for controlling the transmitter 90 in terms of the timing of transmitting the upstream optical signal. The results of processes executed in the controller 86 are stored in the RAM in a readable and rewritable manner, and are freely received and transferred throughout the controller 86.

The reader 108 reads information carried on the downstream control signal SG134 received from the downstream signal receiver 82. More specifically, the reader 106 reads band permission information in the signal SG134.

The signal generator 110 reads the amount of data, i.e. queue length, stored in the buffer 88 and then generates an upstream control signal, indicated by an arrow SG144 in the figure, carrying information on the queue length to transfer the upstream control signal SG144 to the transmitter 90.

The timing controller 112 instructs the transmitter 90 on the timing of transmitting the upstream signal on the basis of the band permission information read by the reader 108.

The transmitter 90 time-multiplexes the upstream data signal SG142 with the upstream control signal SG144 to produce an upstream electric signal. After that, the transmitter 90 electrooptically converts this upstream electric signal to produce a corresponding upstream optical signal, indicated by an arrow SG146.

The transmitter 90 has its output port 114 connected with the optical multi/demultiplexer 80. The transmitter 90 outputs this upstream optical signal SG146 via the optical multi/demultiplexer 80 to the OLT 12 according to the instruction on the timing from the timing controller 112.

Figure 4:
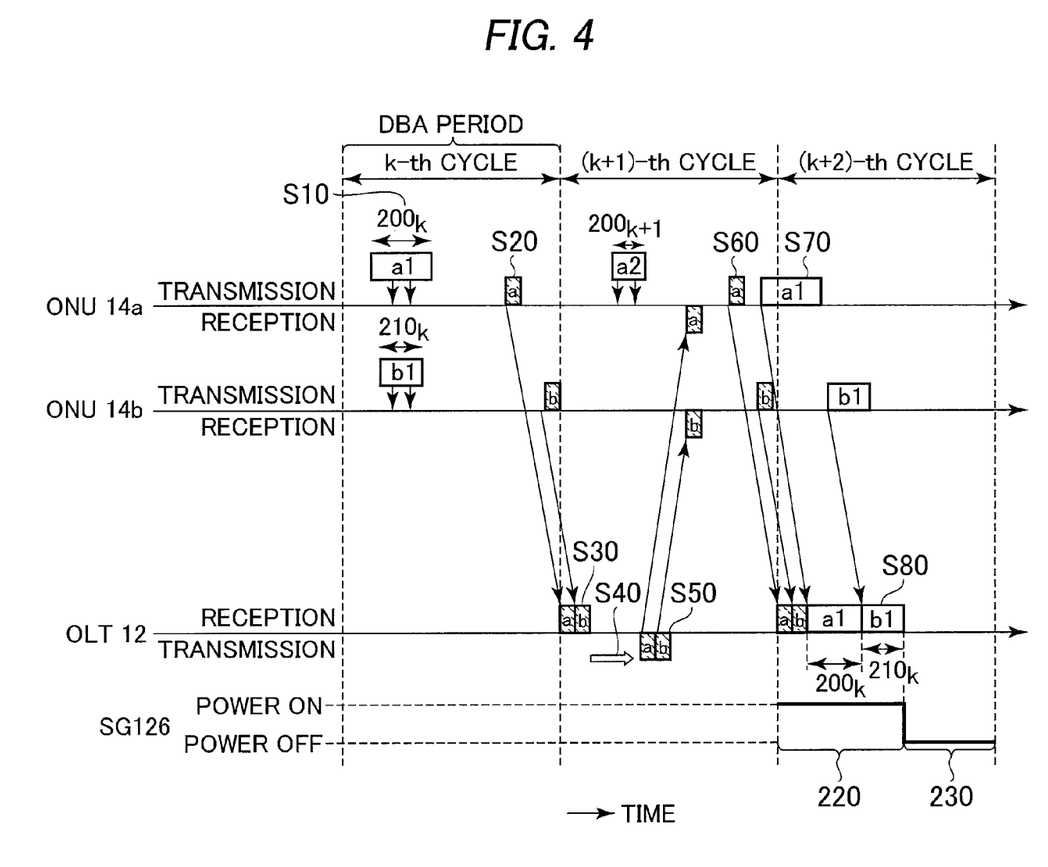
FIGS. 4, 5 and 6 are timing charts useful for illustrating embodiments of band allocation method in accordance with the present invention.
Figure 5:
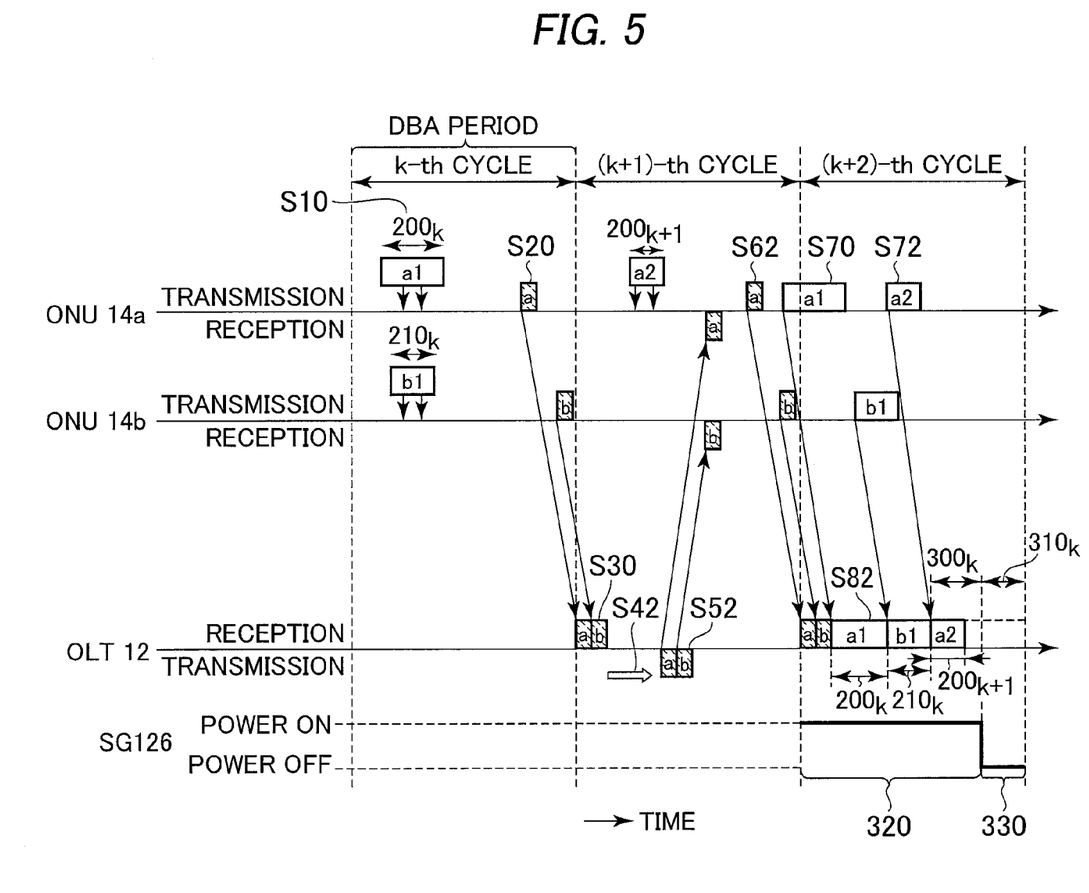
Figure 6:
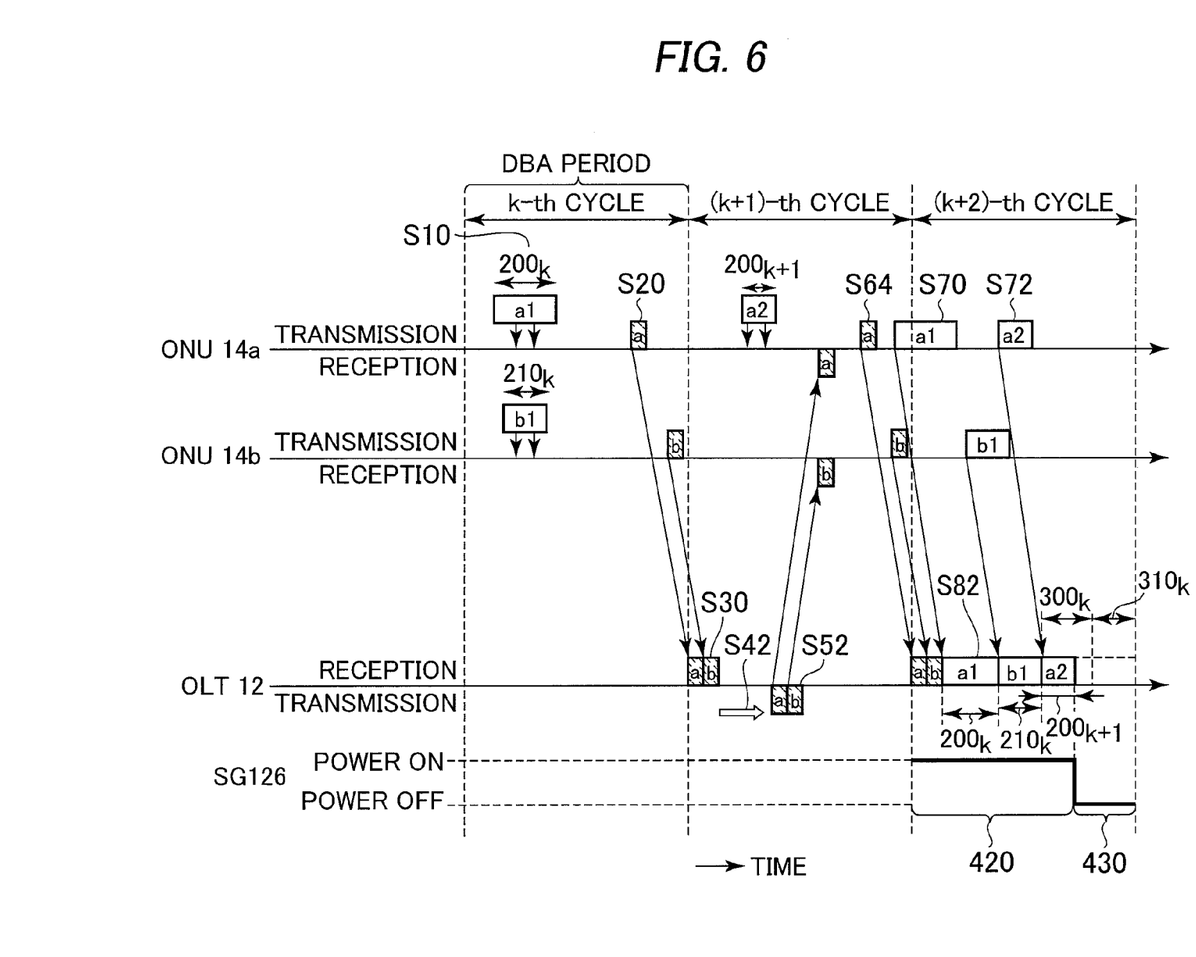

Next, some power supply control methods will be described with reference to FIGS. 1 to 6. In FIGS. 4 to 6, the horizontal axes represent time. In FIGS. 4 to 6, operations of the ONUs 14a and 14b and the OLT 12 are shown in chronological order.

The OLT 12 repeatedly transmits a downstream control signal to each ONU 14. Each ONU 14 uses a permitted band in response to reception of the downstream control signal to transmit upstream control and data signals. In this description, one period of cycle, i.e. DBA period, represents a period of time from when the OLT 12 receives an upstream control signal from a certain ONU (ONU 14a in FIGS. 4-6) until the OLT 12 receives the next upstream control signal from the same ONU (ONU 14a in the figures).

In these power supply control methods, in order not to cause collision between upstream optical signals from the respective ONUs 14, bands are allocated to the respective ONUs 14 in such one period of cycle.

With reference to FIGS. 1-4, an illustrative embodiment of method for controlling the power supply in the OLT 12 will be described below. In FIG. 4, a signal communicating between the OLT 12 and the ONU 14a may be shown as a signal a. Similarly, a signal communicating between the OLT 12 and the ONUs 14b may be shown as a signal b.

Firstly, the ONUs 14a and 14b receive upstream data signals from the user equipment 28a and 28b, respectively. In FIG. 4, the receiving process performed by the ONUs 14 is shown as step S10. In this embodiment, in the k-th cycle, where k is a natural number, it is assumed that the ONUs 14a and 14b receive upstream data a1 and b1 from the user equipment 28a and 28b, respectively. The packet length of the data a1 is indicated by a reference numeral $200_k$. Similarly, the packet length of the data b1 is indicated by a reference numeral $210_k$.

Next, the ONU 14a acquires the packet length $200_k$ as a queue length and then reports this queue length as a requested band to the OLT 12 by delivering a reporting signal a shown in FIG. 4. Similarly, the ONU 14b acquires the packet length $210_k$ as a queue length and then reports this queue length as a requested band to the OLT 12 by delivering a reporting signal b shown in FIG. 4. In the figures, the reporting process is shown as step S20.

Next, the OLT 12 receives the signals a and b conveying the information on the queue length as a requested band from ONUs 14a and 14b, respectively. In the figures, the receiving process executed by the OLT 12 is shown as step S30. In this embodiment, an allocation period is set as a temporal section from reception of an upstream control signal from the ONU 14a until reception of the next upstream control signal from the ONU 14a. Therefore, the OLT 12 receives in the (k+1)-th cycle requested bands corresponding to upstream data produced in the k-th cycle.

The band allocator 68 in the OLT 12 calculates a band to be allocated to each ONU 14 on the basis of the requested bands received from ONUs 14a and 14b. In the figures, the calculating process performed by the OLT 12 is shown as step S40. In this embodiment, the band allocator 68 allocates each ONU 14 to the requested band from that ONU 14 and a band necessary for reception of the upstream control signal from each ONU 14 as an allocation band.

The signal generator 72 in the OLT 12 generates a downstream control signal for reporting the allocation band allocated by the band allocator 68 to each ONU 14. The signal generator 72 further transmits the downstream control signal through the transmitter 34 to the ONU 14. In the figures, the processes performed by the generator 72 are shown as step S50.

The ONU 14, when having received the downstream control signal including information on the allocation band, obtains the timing of transmitting the upstream signal from the reporting signals a and b. The ONU 14 in turn transmits the upstream control and data signals to the OLT 12 at the obtained timing. In the figures, the processes for transmitting the upstream control and data signals are shown as steps S60 and S70, respectively.

The control signal transmitted from each ONU 14 to the OLT 12 in this step S60 is received by the OLT 12 in the (k+2)-th cycle. Meanwhile, the upstream control signal received by the OLT 12 in the (k+2)-th cycle includes a requested band corresponding to upstream data a2, the packet length of which is indicated by reference numeral $200_{k+1}$, received from the user equipment 28 by the ONU in the (k+1)-th cycle.

The OLT 12 receives the upstream control and data signals from the ONUs 14a and 14b. In the figures, the above process for receiving the signals is shown as step S80.

At this time, the feeding controller 70 in the OLT 12 produces the power control signal SG126 for controlling the power feeder 48. The control signal SG126 defines in the allocation period a period corresponding to an allocation band for the upstream control and data signals as a power-on period 220 whereas the remaining period, namely the period other than the power-on period 220, as a power-off period 230. The power feeder 48 switches the power supply on or off in response to the power control signal SG126. More specifically, the power feeder 26 feeds electric power to the upstream signal receiver 40 during the power-on period 220 and stops the power supply to the receiver 40 during the power-off period 230.

In accordance with the instant illustrative embodiment of power supply control method in the optical communication network, a period in which the OLT 12 receives the signals from the ONU 14 is definitely distinct from a period in which the OLT 12 receives no signals from the ONU 14. This allows the power supply in the power-off period 230 to halt to the upstream signal receiver 40.

As described before, the upstream optical signals transmitted from the ONUs 14 maybe received by the OLT 12 with significant attenuation caused by the communication lines such as optical fibers 18 and 20. The optoelectric converter 60 in the upstream signal receiver 40 may typically include circuitry for significantly amplifying the attenuated signal, thus consuming a large amount of electric power. Therefore, the power supply thus controlled to stop to the upstream signal receiver 40, particularly to the optoelectric converter 60, allows the OLT 12 to significantly save electric power.

Next, an alternative embodiment of the power supply control method in accordance with the present invention will be described with reference to FIGS. 1-3 and 5. The processes on steps S10 to S30 may be similar to those in the previous embodiment shown in and described with reference to FIG. 4. The repetitive descriptions thereon will be thus avoided.

In this alternative embodiment, the band allocator 68 in the OLT 12 calculates a band to be allocated to each ONU 14 on the basis of the requested band received from that ONU 14. The calculation process is indicated as step S42 in FIG. 5. In this embodiment, the band allocator 68 allocates each ONU 14 to the requested band from the ONU 14 as an allocation band without changing. Furthermore, the remaining bands, that is, the bands other than the allocation band in the allocation period, are allocated as surplus bands to the respective ONUs 14. For example, the surplus bands may equally be allocated to the respective ONUs 14. In the figures, the surplus bands for the ONUs 14a and 14b are indicated as $300_k$ and $310_k$, respectively.

Next, the signal generator 72 in the OLT 12 generates the downstream control signal for reporting to each ONU 14 the allocation band and the surplus band, which are set in step S42. The signal generator 72 transmits the generated control signal to the downstream signal transmitter 34, which in turn transmits the control signal to the ONU 14. The production and transmission process of the downstream control signal is indicated as step S52 in FIG. 5.

When the ONU 14 receives the downstream control signal carrying information on the allocation band and the surplus band, it obtains the timing of transmitting the upstream signal. In this embodiment, the ONU 14a receives upstream data a2 from the user equipment 28a in the (k+1)-th cycle. In the illustrative example, the ONU 14a receives the upstream data a2 at the obtained timing, and transmits to the OLT 12 an upstream control signal for reporting that the ONU 14a uses the surplus band to transmit the upstream data a2. The reporting process by the ONU 14 is indicated as step S62 in FIG. 5.

For example, if the upstream data signal received in the (k+1)-th cycle and stored in the buffer 88 has its packet length longer than the surplus band, a requested band for the newly received data signal may be added to the reporting to the OLT 12.

The control signal transmitted from each ONU 14 to the OLT 12 in step S62 is received by the OLT 12 in the (k+2)-th cycle. Thereafter, in step S70, the ONU 14 of interest uses the allocation band to transmit the upstream data signal received by that ONU 14 in the k-th cycle. Furthermore, the ONU 14a transmits the upstream data signal received in the (k+1)-th cycle on the surplus band as a transmitting process of step S72.

The OLT 12 receives the upstream control signals and the upstream data signals from the ONUs 14a and 14b. The receiving process by the OLT 12 is indicated as step S82 in FIG. 5.

The OLT 12 sets a period corresponding to an allocation band for the upstream control and data signals as a power-on period 320. If the ONU 14 for which the surplus band is set reports that the ONU 14 uses the surplus band to transmit the upstream data a2, the OLT 12 also sets this surplus band $300_k$ as the power-on period 320. On the contrary, a period not set as the power-on period 320 in the allocation period is determined as a power-off period 330. With this alternative embodiment shown in FIG. 5, the surplus band $310_k$ prepared for ONU 14b is set as the power-off period 330.

The power control signal SG126 conveying information on the power-on period 320 and the power-off period 330 is transferred to the power feeder 48 in the OLT 12.

The power feeder 48 feeds power to the upstream signal receiver 40 in the power-on period 320 and interrupts the power supply to the receiver 40 in the power-off period 330.

In accordance with the instant alternative embodiment also, the OLT 12 can stop the power supply to the upstream signal receiver 40 within the power-off period 330, as with the previous embodiment. Furthermore, in accordance with this embodiment, an upstream data signal generated after having reported a band to be used can be transmitted on the surplus band, thus minimizing a delay in transmitting the upstream signal.

Next, a further alternative embodiment of the power supply control method will be described with reference to FIGS. 1-3 and 6. The processes on steps S10 to S52 may be similar to those in the previous embodiments shown in and described with reference to FIGS. 4 and 5. The repetitive descriptions thereon will be thus refrained from.

In this alternative embodiment, the ONU 14, when having received the downstream control signal carrying information on the allocation band and the surplus band, it obtains the timing of the transmitting of the upstream signal. In this embodiment, the ONU 14a receives upstream data a2 from the user equipment 28a in the (k+1)-th cycle. In the present illustrative example, the ONU 14a receives the upstream data a2 at the obtained timing, and transmits to the OLT 12 an upstream control signal indicative of the usage amount of a surplus band for reporting the packet length $200_{k+1}$ of an upstream data signal to be transmitted on the surplus band. The reporting process by the ONU 14 is indicated as step S64 in FIG. 6.

If the upstream data signal received in the (k+1)-th cycle and stored in the buffer 88 has its packet length longer than the surplus band, a requested band for the newly received data signal may be added to the reporting to the OLT 12, as with the previous alternative embodiment.

Thereafter, the ONU 14 transmits the upstream control and data signals to the OLT 12. On the allocation band, an upstream data signal received by the ONU 12 in the k-th cycle is transmitted. On the surplus band, an upstream data signal received by the ONU in the (k+1)-th cycle is transmitted.

The control signal transmitted from each ONU 14 to the OLT 12 in this process is received by the OLT 12 in the (k+2)-th cycle.

The OLT 12 receives the upstream control and data signals from the ONUs 14a and 14b. The receiving process of the OLT 12 is indicated as step S82 in FIG. 6. At this time, a period corresponding to an allocation band for the upstream control and data signals is set as a power-on period 420.

If the ONU 14 for which the surplus band is set reports a packet length in the form of information on usage of the surplus band, a period corresponding to the packet length $200_{k+1}$ in this surplus band $300_k$ is also set as the power-on period 420. Meanwhile, the remaining period, other than the above power-on period 420, in the allocation period is set as a power-off period 430. The power control signal SG126 containing information on the power-on period 420 and the power-off period 430 is eventually transferred to the power feeder 48.

When the power feeder 48 receives the power control signal SG126, the power feeder 48 feeds electricity to the upstream signal receiver 40 in the power-on period 420 and halts the power supply to the upstream signal receiver 40 in the power-off period 430.

In accordance with this alternative embodiment, the OLT 12 can stop the power supply to the upstream signal receiver 40 within the power-off period 430, as with the previous embodiments. With the instant alternative embodiment also, an upstream data signal generated after having reported a band to be used can be transmitted on the surplus band, thus minimizing a delay in transmitting the upstream signal, as with the previous alternative embodiment. In addition to those, in a period that is set as a surplus band, only a period of receiving no upstream signal is set as the power-off period 430 to stop the power supply during this period. This accomplishes further electric power saving while delay in upstream signals is minimized.

The entire disclosure of Japanese patent application No. 2011-147232 filed on Jul. 1, 2011, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An optical line terminal forming an optical communication network together with a plurality of optical network units, comprising:
   an receiver converting an upstream optical signal, received from the optical network unit, into a corresponding upstream electric signal and then deriving an upstream control signal controlling said optical line terminal from the upstream electric signal;
   a controller operative in response to the upstream control signal for generating a power control signal switching on or off power supply to said receiver; and
   a power feeder operative in response to the power control signal for switching on or off the power supply to said receiver.

2. The optical line terminal in accordance with claim 1, wherein said controller includes:
   a reader reading a requested band of the optical network unit from the upstream control signal;
   a band allocator setting an allocation band for the optical network unit on a basis of the requested band; and
   a feeding controller generating the power control signal, the power control signal defining a period corresponding to the allocation band as a power-on period and a period other than the power-on period as a power-off period.

3. The optical line terminal in accordance with claim 2, wherein the upstream control signal conveys surplus band usage information representing whether or not the optical network unit uses a surplus band to transmit information to the optical line terminal,
   said band allocator allocates to the optical network unit the surplus band in addition to the allocation band, and
   said feeding controller sets the power-on period to a period corresponding to the surplus band used by the optical network unit in addition to the period corresponding to the allocation band.

4. The optional line terminal in accordance with claim 3, wherein the surplus band usage information further includes a surplus band usage amount, and
   said feeding controller sets the power-on period to a period corresponding to the surplus band usage amount in the surplus band used by the optical network unit in addition to a period corresponding to the allocation band.

5. An optical communication network comprising an optical line terminal and a plurality of optical network units connected to said optical line terminal, wherein said optical line terminal includes:
   an receiver converting an upstream optical signal, received from said optical network unit, into a corresponding upstream electric signal and then deriving an upstream control signal controlling said optical line terminal from the upstream electric signal;
   a controller operative in response to the upstream control signal for generating a power control signal switching on or off power supply to said receiver; and
   a power feeder operative in response to the power control signal for switching on or off the power supply to said receiver.

6. The optical communication network in accordance with claim 5, wherein said controller includes:
   a reader reading a requested band of said optical network unit from the upstream control signal;
   a band allocator setting an allocation band for said optical network unit on a basis of the requested band; and
   a feeding controller generating the power control signal, the power control signal defining a period corresponding to the allocation band as a power-on period and a period other than the power-on period as a power-off period.

7. The optical communication network in accordance with claim 6, wherein, when said optical network unit transmits the upstream optical signal to said optical communication network, the upstream optical signal conveying surplus band usage information representing that said optical network unit uses a surplus band to transmit information to said optical line terminal,
   said band allocator allocates to said optical network unit the surplus band in addition to the allocation band, and
   said feeding controller sets the power-on period to a period corresponding to the surplus band used by said optical network unit in addition to the period corresponding to the allocation band.

8. The optical communication network in accordance with claim 7, wherein the surplus band usage information further includes a surplus band usage amount, and
   said feeding controller sets the power-on period to a period corresponding to the surplus band usage amount in the surplus band used by said optical network unit in addition to a period corresponding to the allocation band.

9. A method for controlling power supply of an optical line terminal forming an optical communication network together with a plurality of optical network units, the optical line terminal comprising an receiver converting an upstream optical signal received from the optical network unit into a corresponding upstream electric signal and then deriving an upstream control signal controlling the optical line terminal from the upstream electric signal, said method comprising:
   setting by the optical line terminal, when the optical line terminal receives information on a requested band corresponding to an upstream data signal generated in the k-th cycle (k is a natural number) from the optical network unit, an allocation band for the optical network unit on a basis of the requested band;
   reporting the set allocation band in the (k+2)-th cycle to the optical network unit from the optical line terminal; and
   setting by the optical line terminal, when the optical network unit transmits the upstream data signal generated in the k-th cycle so that in the (k+2)-th cycle the optical line terminal receives the upstream data signal generated in the k-th cycle, a period corresponding to the allocation band in the (k+2)-th cycle as a power-on period to enable power supply to the receiver and a period other than the power-on period in the (k+2)-th cycle as a power-off period to stop the power supply to the receiver.

10. The method in accordance with claim 9, further comprising:
    setting by the optical line terminal, when the optical line terminal receives information on a requested band corresponding to an upstream data signal generated in the k-th cycle from each of the optical network units, an surplus band as well as the allocation band for the optical network unit on the basis of the requested band;
    reporting the set surplus band as well as the set allocation band in the (k+2)-th cycle to the optical network unit from the optical line terminal; and
    setting by the optical line terminal, when the optical network unit reports a use of the surplus band for sending the upstream data signal generated in the (k+1)-th cycle to the optical line network and then transmits the upstream data signal generated in the k-th cycle so that in the (k+2)-th cycle the optical line terminal receives the upstream data signal generated in the k-th cycle through the use of the allocation band and the upstream data signal generated in the (k+1)-th cycle so that in the (k+2)-th cycle the optical line terminal receives the upstream data signal generated in the (k+1)-th cycle through the use of the surplus band, a period corresponding to the allocation band and the surplus band in the (k+2)-th cycle as a power-on period to enable power supply to the receiver and a period other than the power-on period in the (k+2)-th cycle as a power-off period to stop the power supply to the receiver.

11. The method in accordance with claim 9, further comprising:
    setting by the optical line terminal, when the optical line terminal receives information on a requested band corresponding to an upstream data signal generated in the k-th cycle from each of the optical network units, an surplus band as well as the allocation band for the optical network unit on the basis of the requested band;
    reporting the set surplus band as well as the set allocation band in the (k+2)-th cycle to the optical network unit from the optical line terminal; and
    setting by the optical line terminal, when the optical network unit reports a surplus band usage amount of the surplus band for sending the upstream data signal generated in the (k+1)-th cycle to the optical line network and then transmits the upstream data signal generated in the k-th cycle so that in the (k+2)-th cycle the optical line terminal receives the upstream data signal generated in the k-th cycle through the use of the allocation band and the upstream data signal generated in the (k+1)-th cycle so that in the (k+2)-th cycle the optical line terminal receives the upstream data signal generated in the (k+1)-th cycle through the use of the surplus band, a period corresponding to the allocation band and the surplus band usage amount of the surplus band in the (k+2)-th cycle as a power-on period to enable power supply to the receiver and a period other than the power-on period in the (k+2)-th cycle as a power-off period to stop the power supply to the receiver.

12. An optical line terminal forming an optical communication network together with a plurality of optical network units, comprising:
    an receiver obtaining an upstream signal on a basis of an upstream optical signal, received from the optical network unit, and then deriving an upstream control signal controlling said optical line terminal from the upstream signal;
    a controller operative in response to the upstream control signal for generating a power control signal switching on or off power supply to said receiver; and
    a power feeder operative in response to the power control signal for switching on or off the power supply to said receiver.

13. The optical line terminal in accordance with claim 12, wherein said controller includes:
    a reader reading a requested band of the optical network unit from the upstream control signal;
    a band allocator setting an allocation band for the optical network unit on the basis of the requested band; and
    a feeding controller generating the power control signal, the power control signal defining a period corresponding to the allocation band as a power-on period and a period other than the power-on period as a power-off period.

* * * * *